US005637332A

United States Patent [19]

Ridout

[11] Patent Number: 5,637,332

[45] Date of Patent: Jun. 10, 1997

[54] APPARATUS FOR FORMING A FILL LINE IN A PAPER CUP

[76] Inventor: John Ridout, 136 Belmont St. Apt. 17, London, Ontario, Canada, N6J 3T4

[21] Appl. No.: 560,323

[22] Filed: Nov. 17, 1995

[51] Int. Cl.[6] .......... B29C 53/02

[52] U.S. Cl. .......... 425/356; 425/392; 425/393; 425/398

[58] Field of Search .......... 425/392, 393, 425/398, 356

[56] References Cited

U.S. PATENT DOCUMENTS

| | | | |
|---|---|---|---|
| 1,122,393 | 12/1914 | House | 425/398 |
| 2,415,925 | 2/1947 | Wiley | 425/356 |
| 2,473,836 | 6/1949 | Wixon et al. | 425/393 |
| 3,054,144 | 9/1962 | Goodwin et al. | 425/356 |
| 3,065,677 | 11/1962 | Loeser | 425/393 |
| 3,570,065 | 3/1971 | Guerrero | 425/393 |
| 3,823,216 | 7/1974 | Petzetakis | 264/571 |
| 3,874,830 | 4/1975 | Carter et al. | 425/398 |
| 3,923,952 | 12/1975 | Branche et al. | 425/393 |
| 4,095,927 | 6/1978 | Roberg et al. | 425/525 |
| 4,247,277 | 1/1981 | Marion | 425/393 |

*Primary Examiner*—Robert Davis

[57] ABSTRACT

A simple apparatus for forming a fill line in a paper beverage container such as a paper cup is disclosed. The apparatus includes no moving parts. A fill line is formed by forcing a punch of a mating ring into a finished cup positioned in a die which includes an annular recess spaced below the rim of the finished cup, the annular recess terminating in a bottom edge which serves as an anvil surface for forming the fill line. The fill line provides a user of the beverage container with a reference point for establishing a consistent measure of volume. The advantage is a simple apparatus adapted to be fitted to most paper cup finishing machines. The apparatus has no moving parts and is therefore not prone to requiring maintenance or replacement.

6 Claims, 5 Drawing Sheets

APPARATUS FOR FORMING A FILL LINE IN A PAPER CUP

TECHNICAL FIELD

The present invention relates to beverage containers, and in particular to apparatus for forming a fill line in a paper beverage container such as a paper cup.

BACKGROUND OF THE INVENTION

Disposable beverage containers are widely used in the fast food industry for serving coffee, soft drinks and the like. It has long been recognized as desirable to provide disposable beverage containers that include a fill line. The fill line provides the consumer with a reference point in order to establish a consistent measure of volume of the beverage purchased. The fill line is also advantageous because it provides those serving the public with a reference point to indicate a full measure of liquid while ensuring adequate space in the top of the container to accommodate a lid without spillage.

Fill lines are particularly desirable in hot beverage containers. It is well known that hot beverage containers are constructed differently than cold beverage containers and they require a different type of lid. Cold beverage containers are coated both inside and outside. The coating, typically a wax or a plastic polymer, enhances the transmission of heat through the container sidewall. This makes the drink feel cold, which is deemed desirable. It also promotes a good seal with the lid, so cold beverage container lids are flat with a depending skirt that locks over the rim of the container to contain the cold liquid. Hot beverage containers are only coated on the inside, however, because an outer coating would make the containers too hot to be handled. Consequently, it is more difficult to achieve a liquid tight seal with a lid. To inhibit leakage, the lid for a hot beverage container is designed to fit within the mouth of the container so that an internal depending skirt of the lid contacts the inner coated sidewall of the container to improve the seal. If the container is overfilled with hot liquid, some liquid is forced over the rim when a lid is applied. This spillage can be misinterpreted by consumers as resulting from a leaky container, and they may request that the container and the liquid be replaced. It is therefore desirable to provide containers, and in particular hot beverage containers, with a fill mark to avoid this problem.

It is known that a bead or fill line in a beverage container such as a paper cup can be formed by utilizing a spinning forming disc, the disc being spun into a position near the top of the sidewall of the paper container thereby creating a bead, groove or fill line in the sidewall of the container. This apparatus requires a cam follower in a machined cam track, and a cam drive shaft in a relatively complicated header assembly as well as an auxiliary loader for the spinning disc. Thus a substantial number of precision moving parts are required. Such units are therefore relatively expensive to construct and to maintain.

A less complicated cup bead or line former is disclosed in U.S. Pat. No. 4,247,277 which issued Jan. 27, 1981 to Marion. This patent describes an apparatus for forming a fill line or groove in paper cups or containers by axially compressing an annulus of a resilient material thereby causing a controlled deformation of the material outwardly about its periphery. The outward deformation occurs internally of a cup pot or die which includes an internal fill line or groove defining cavity into which a portion of the sidewall of a paper cup or container confined within the die is forced by the compressed annulus to form the fill line or groove. While this apparatus is less complicated than the spinning forming discs previously used for the same purpose, it is still a complicated apparatus which requires moving parts that tend to wear, require maintenance and replacement.

Forming techniques are also known in the pipe finishing arts. Exemplary of pipe finishing apparatus are taught in U.S. Pat. No. 3,570,065 which issued on Mar. 16, 1971 to Guerrero; U.S. Pat. No. 3,923,952 which issued Dec. 2, 1975 to LaBranche et al.; and, U.S. Pat. No. 3,823,216 which issued Jul. 9, 1974 to Petzetakis. Each of those patents teach an apparatus for shaping a normally rigid plastic pipe which includes an expandable elastomeric forming member. Each of the apparatus also includes a leading portion having an outer diameter corresponding to the internal diameter of the undeformed pipe and a trailing portion which expands the pipe to form a belied coupling.

All of the known apparatus in the prior art include moving parts for forming a fill line in a paper cup or a bell in a pipe coupling.

Accordingly, it is a primary object of the present invention to provide a simplified apparatus for forming a fill line in a paper container such as a paper cup.

It is a further object of the invention to provide an apparatus for forming a fill line in a paper container such as a paper cup which is inexpensive to manufacture and requires substantially no maintenance.

SUMMARY OF THE INVENTION

In accordance with the present invention, there is provided an apparatus for forming a fill line in a sidewall of a paper cup, comprising:

- a die for supporting a sidewall of the paper cup, the die including a top edge for supporting a rim of the cup and an annular recess located beneath the top edge, the annular recess having a bottom edge spaced beneath the rim;
- a mating ring which includes a punch adapted to be received within the cup without distorting the rim, the punch being adapted to abut against the bottom edge of the annular recess when the punch is forced downwardly within the cup;
- whereby when the punch is forced downwardly within a cup positioned in the die, the mating ring stretches the sidewall of the cup into the recess and an annular ridge is formed in the sidewall when the punch abuts the bottom edge of the annular recess, the annular ridge providing the fill line as a reference point for establishing a consistent measure of volume.

The present invention thus provides a simple apparatus having no movable parts for forming a fill line in the sidewall of a paper cup. The apparatus may be used to form a fill line in a paper beverage container of any shape or configuration, provided that the mouth of the container is larger in diameter than the sidewall of the container where the fill line is to be formed.

The apparatus is used to form a fill line after the paper cup has gone through the cup finishing process and is preferably added as an extra station at the rimming turret of a cup finishing machine. The apparatus includes a die for supporting the finished cup, the die closely conforming to the sidewalls of the cup and having a top edge for supporting the rim of the cup with an annular recess spaced below the top edge, the annular recess terminating in an anvil surface. A mating ring which includes a punch having a shape complementary with the rim of the cup and adapted to be received in the cup without distorting the rim. The punch is sized to contact the anvil surface of the annular recess spaced below the rim of the cup. When the punch is forced downwardly in the cup, it stretches the sidewall of the cup and forms a fill line at the point where the punch contacts the anvil surface. The fill line is visible both inside and outside the cup and provides a reference point for establishing a consistent measure of volume that is visible both inside and outside the cup.

BRIEF DESCRIPTION OF THE DRAWINGS

The invention will now be explained in more detail by way of example only, and with reference to the following drawings, wherein.

DETAILED DESCRIPTION OF THE PREFERRED EMBODIMENT

Figure 1:
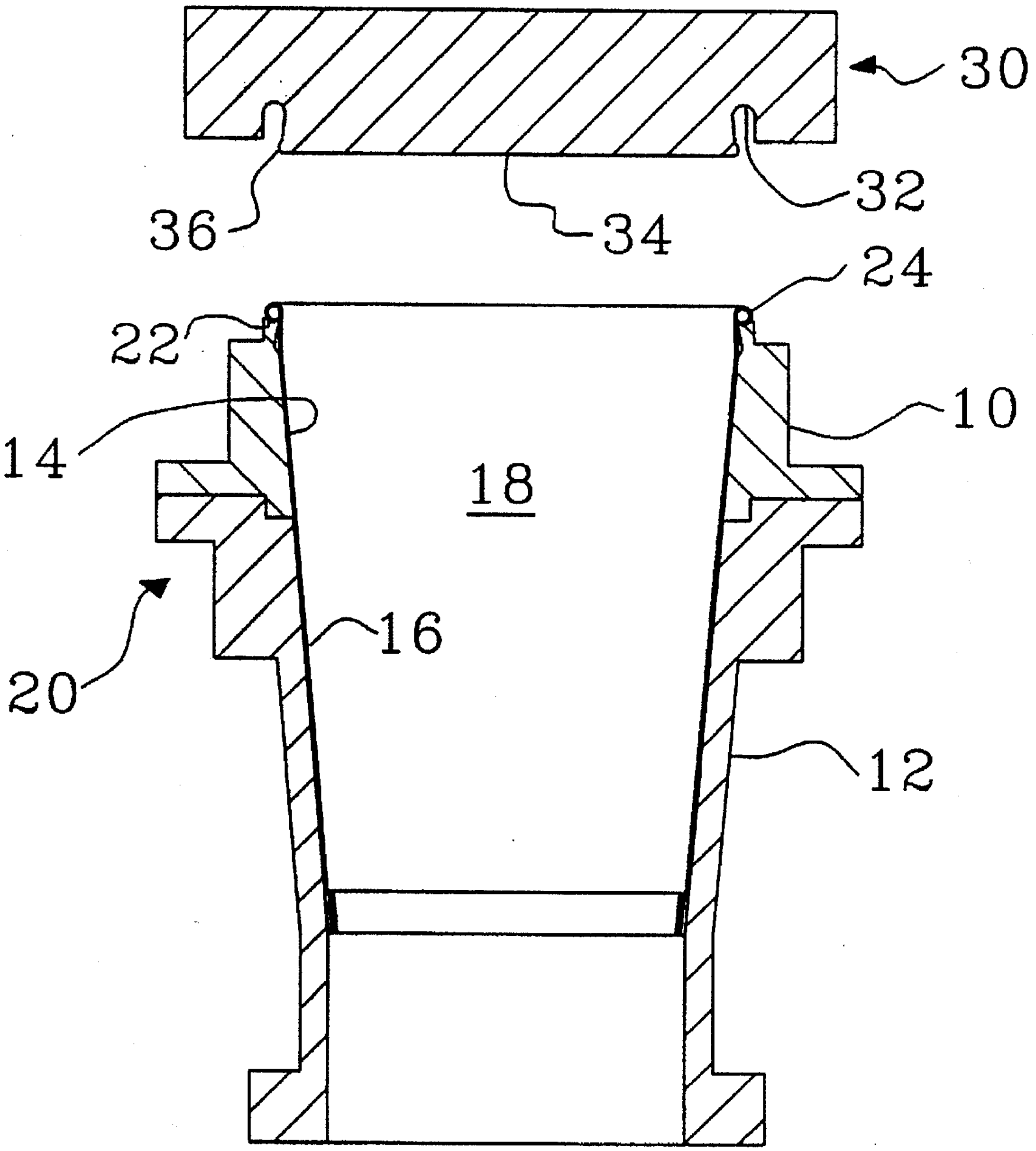
FIG. 1 is a vertical cross-sectional view of a paper cup positioned in an apparatus in accordance with the invention.

FIG. 1 shows a vertical cross-section of the apparatus in accordance with the invention. As is apparent, the apparatus is extremely simple, yet it has proven to be quite effective. The apparatus includes a modified cup finishing die ring 10 which is supported on a cup pocket 12 in a manner well known in the art. The die ring 10 and the cup pocket 12 have a smooth inner surface 14 which conforms closely to a sidewall 16 of a paper cup 18. The die ring 10 and the cup pocket 12 may be constructed as a unit and are hereinafter simply referred to as a die 20. The die 20 includes a top edge 22 for supporting a rim 24 of the paper cup 18. The top edge 22 is grooved to support the rim 24.

Spaced below the rim is an annular recess 26 which is machined in the inner surface 14 of the die 20. The annular recess 26 terminates on its lower side in a bottom edge 28 which is spaced beneath the rim 24. The bottom edge 28 serves as an anvil surface for forming a fill line as will be explained below in more detail.

The apparatus in accordance with the invention also includes a mating ring 30 which stamps a fill line into the sidewall of the paper cup 18. The mating ring 30 includes an annular mating ring groove 32 for accommodating the rim 24 of the paper cup 18. The mating ring groove 32 surrounds a punch 34 sized to enter the mouth of the cup 18 without deforming the rim 24. The punch 34 includes an annular shoulder 36 which engages the anvil 28 to form the fill line in the paper cup 18, as shown in FIG. 2.

Figure 2:
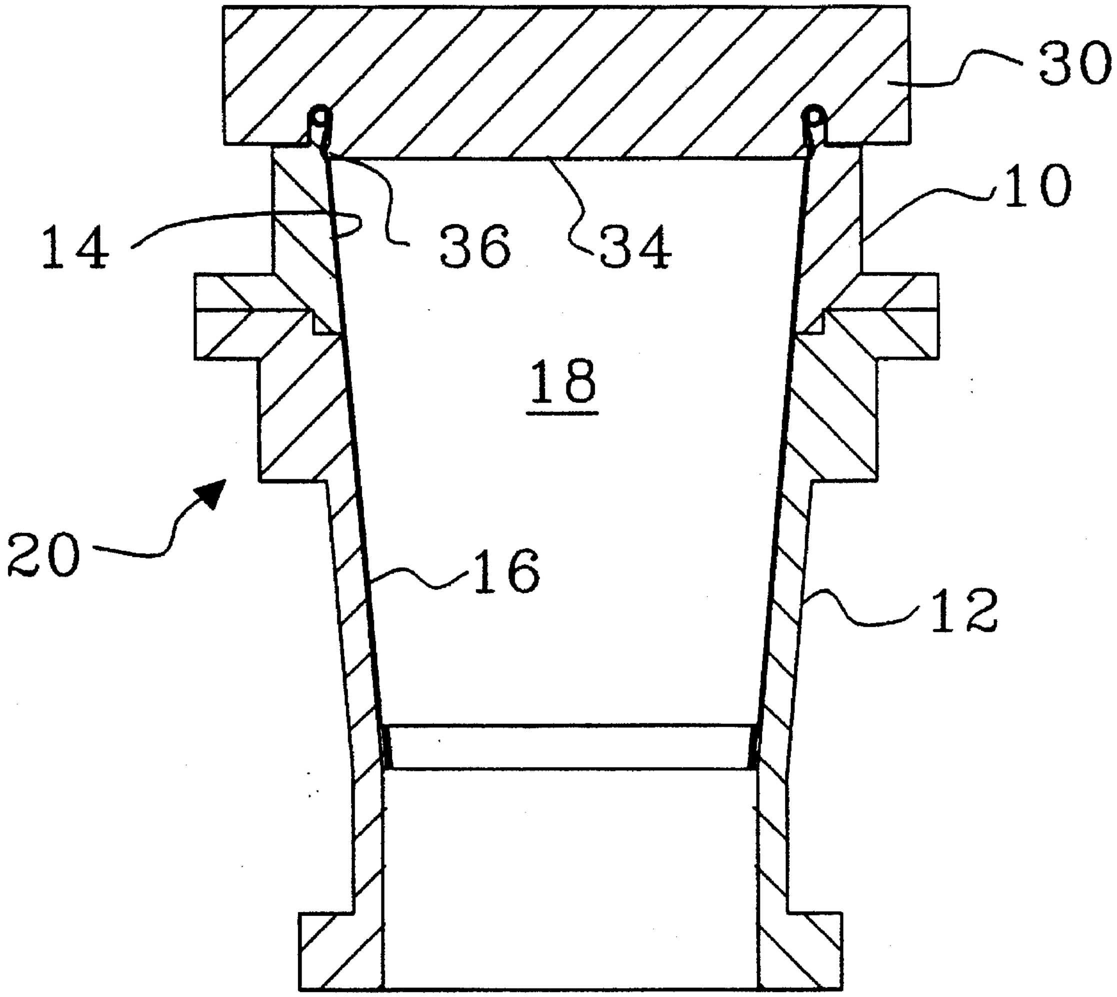
FIG. 2 is a schematic vertical cross-sectional view of the apparatus in accordance with the invention in use.

FIG. 2 is a schematic cross-sectional view of a paper cup supported in an apparatus in accordance with the invention, the mating ring 30 being in the position required to deform the sidewall 16 of the paper cup to form a fill line 38 therein.

Figure 3:
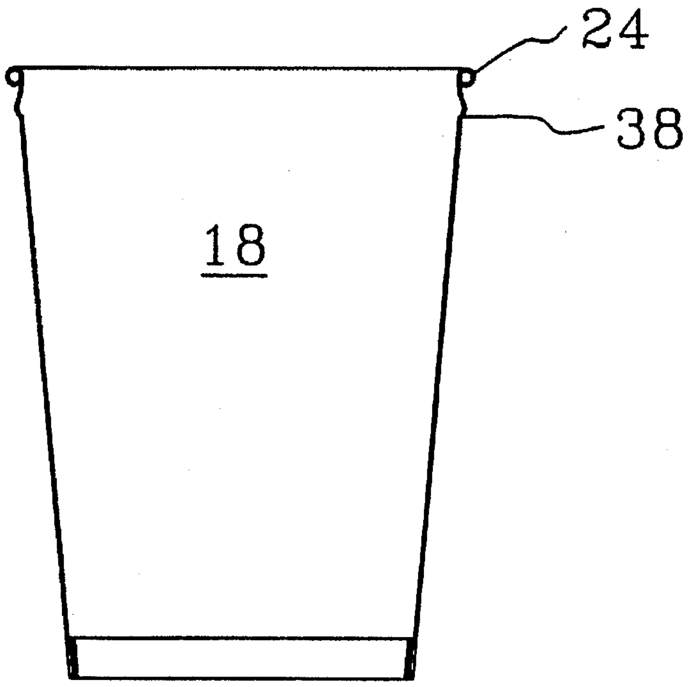
FIG. 3 is a vertical cross-sectional view of a paper cup having a fill line formed by the apparatus in accordance with the invention.
Figure 4:
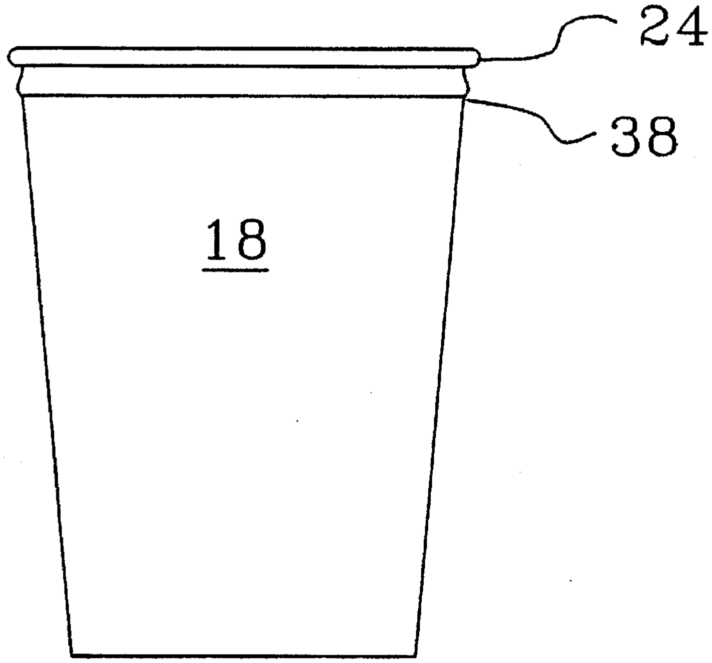
FIG. 4 is a side elevational view of the paper cup shown in FIG. 3.

As seen in FIGS. 3 and 4, the fill line 38 is formed by stretching the cup sidewall 16 when the punch 34 of the meeting ring 32 contacts the anvil 28 of the annular recess 26 in the die 20. The fill line 38 is visible from the inside and the outside of the paper cup 18. It provides a readily apparent reference point in order to establish a consistent measure of volume for those serving the public as well as for those purchasing a beverage in a paper container. It should be noted that while the position of the fill line 38 shown in FIGS. 3 and 4 is spaced beneath the rim by about ⅜" (1 cm), the fill line 38 may be positioned elsewhere in the cup. If the fill line 38 is to be lower, the annular recess 26 is positioned further down on the inner surface 14, and the diameter of the punch 34 is reduced so that it contacts the anvil 28. If the fill line 38 is to be higher in the cup, the anvil 28 is positioned nearer the rim 24 and the diameter of the punch is increased slightly so that it contacts the anvil 28.

It should also be noted that while the paper cups described to illustrate the preferred embodiment of the invention are of the classic frusto-conical shape universally adapted for paper cups, the invention is in no way limited to cups of that shape. The die 20 and the punch 34 can be shaped as required to accommodate containers of other shapes or configurations.

Figure 5:
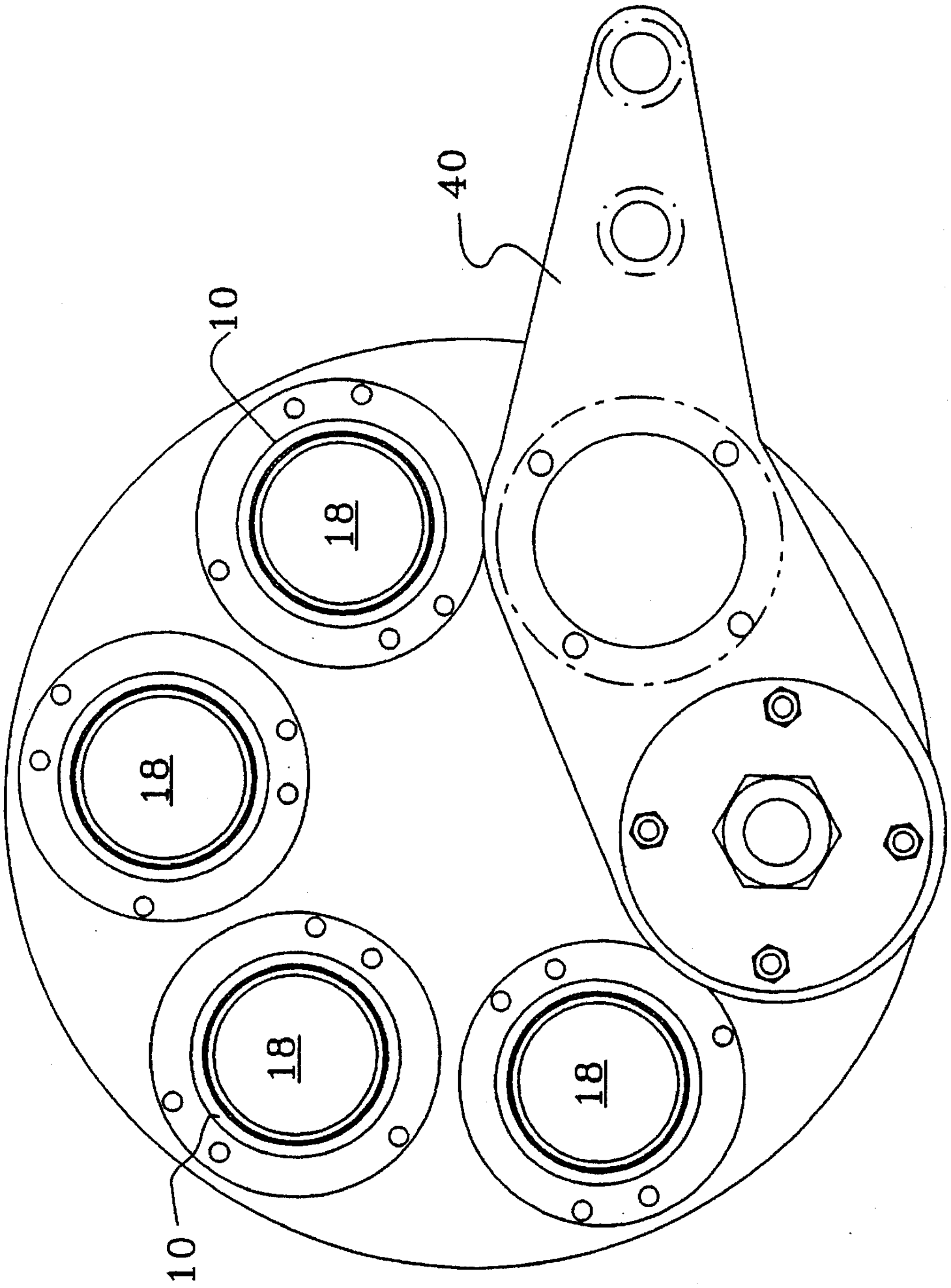
FIG. 5 is a top plan schematic view of a station at the rimming turret of a cup finishing machine.

FIG. 5 shows a top plan view of a station at the rimming turret of a cup finishing machine. The cup finishing machine illustrated is, by way of example, a Paper Machinery Corporation Model G-1000. The apparatus in accordance with the invention may be adapted for use with cup finishing machines manufactured by other manufacturers. The finishing station includes an articulated forming arm 40 which presses the mating ring 30 over the top of the finished cups 18 supported in the dies 20 in a manner well known in the art.

Figure 6:
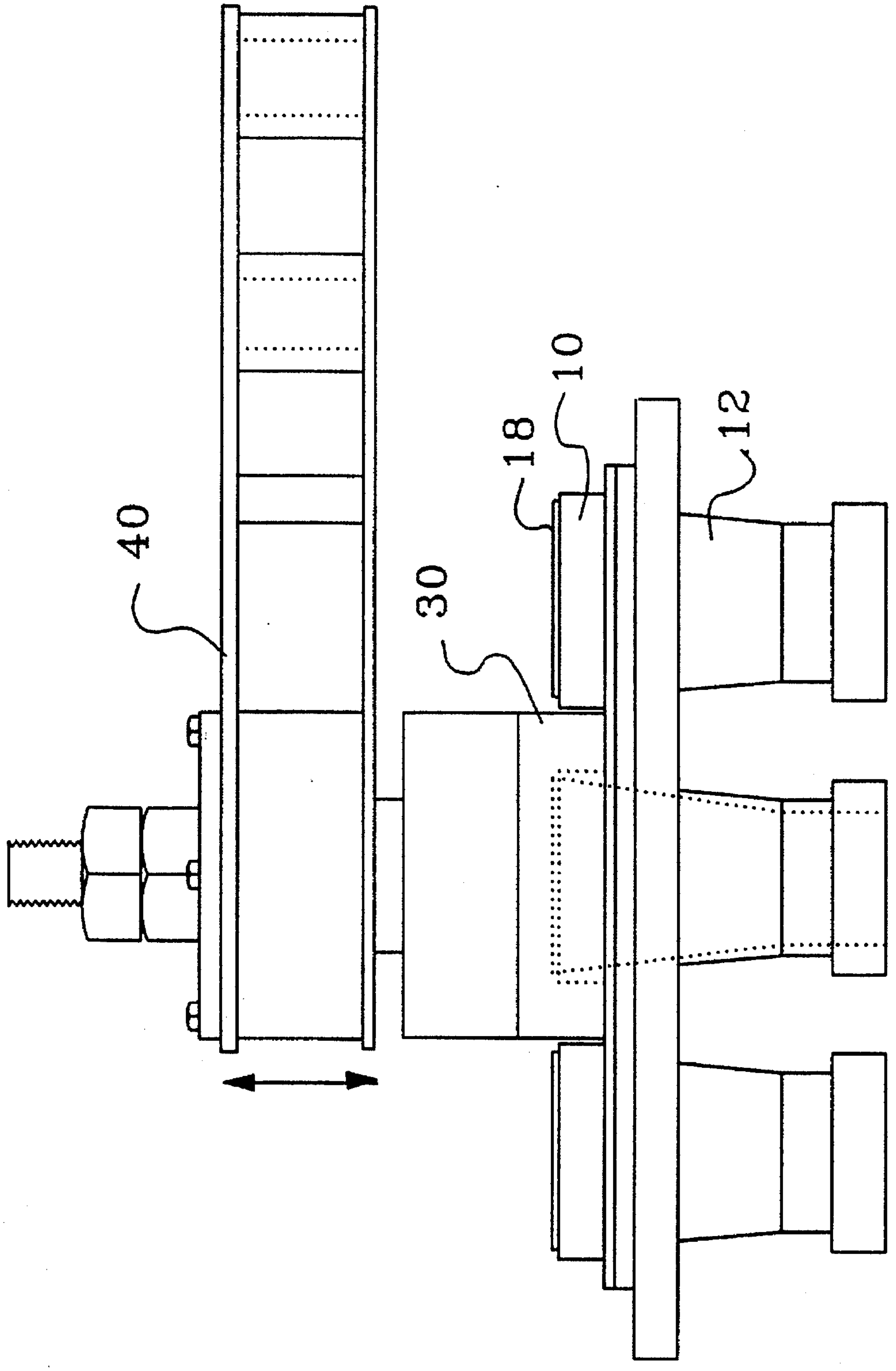
FIG. 6 is a side elevational schematic view of the station at the rimming turret shown in FIG. 5.

As can be seen in FIG. 6, the articulated forming arm 40 moves vertically to insert the mating ring 30 into each finished cup and force the punch 34 of the mating ring 30 into the cup where the annular shoulder 36 substantially uniformly contacts the anvil 28 located at the bottom of the annular recess 26 to form the fill line 38. The die rings 10 and the cup pockets 12 are indexed around a center axis and are positioned sequentially under the forming arm 40. The forming arm 40 moves only vertically. There is an adjustment mechanism which permits the horizontal position of the mating ring 30 to be adjusted. After this adjustment is established the dies 20 are rotated sequentially into a position under the forming arm 40, which presses the mating ring 30 into each die to rapidly form the fill line 38 in each cup 18.

It is therefore apparent that a novel, simple apparatus for forming the fill line in a paper beverage container has been disclosed. The apparatus contains no moving parts, is not subject to appreciable wear or maintenance, and once adjusted can form the fill lines in many thousands of paper cups without requiring maintenance of any kind.

The embodiments of the invention described above is intended to be exemplary only. Changes and modifications will undoubtedly occur to persons skilled in the art. The scope of the invention is therefore intended to be limited solely by the scope of the appended claims.

I claim:

1. An apparatus for forming a fill line in a sidewall of a paper cup comprising:
   - a die for supporting a sidewall of the paper cup, the die including a top edge for supporting a rim of the cup and an annular recess located beneath the top edge, the annular recess having a bottom edge spaced beneath the rim;
   - a mating ring which includes a punch that is adapted to be received within the cup without distorting the rim, the punch being disc shaped and including a protruding annular shoulder located at a bottom edge thereof, a bottom surface of the annular shoulder contacting the bottom edge of the annular recess to form the fill line;

whereby when the punch is forced downwardly within a cup positioned in the die, the punch stretches the sidewall of the cup into the recess and an annular ridge is formed in the sidewall when the mating ring abuts the bottom edge of the annular recess, the annular ridge providing the fill line as a reference point for establishing a consistent measure of volume.

2. Apparatus for forming a fill line in a paper cup having a frusto-conical sidewall comprising:

a die adapted to receive and support the cup, the die closely conforming with an outer surface of the sidewall of the paper cup and including a top edge for supporting a rim at a top of the sidewall, and an annular recess located under the top edge, the annular recess having a bottom edge spaced beneath the top edge, the bottom edge being adapted to serve as an anvil for forming the fill line;

a mating ring adapted to be carried by an arm of a paper cup machine, the mating ring including a disc shaped punch adapted to be received in the cup without deforming the rim and to substantially uniformly contact the anvil when forced into the cup by the arm of the paper cup machine, the disc shaped punch having a protruding shoulder at a bottom edge thereof, the protruding shoulder contacting the anvil to form the fill line;

whereby when the punch is forced downwardly by the arm of the paper machine into a cup positioned in the die, a peripheral edge of the punch stretches the sidewall of the cup and when the punch contacts the anvil, an annular ridge is formed in the sidewall, the annular ridge serving as a fill mark to provide a user of the cup with a consistent measure of volume.

3. Apparatus for forming a fill line in a frusto-conical shaped paper cup having a rim that surrounds a top edge of a sidewall of the cup, the apparatus comprising:

a die adapted to receive and support the cup, the die including a top edge with a groove for receiving and supporting the rim of the cup, and the die further including an annular recess spaced below the top edge, the annular recess having a bottom edge that serves as an anvil for forming the fill line;

a mating ring adapted to be carried by a forming arm of a paper cup machine, the forming arm being located on a rimming turret of the machine, the mating ring including a punch adapted to be received in the cup without deforming or distorting the rim of the cup, and for contacting the anvil in a substantially uniform engagement when the punch is forced downwardly into the cup by the forming arm, the punch being disc shaped and including a protruding annular shoulder located at a bottom edge thereof, the bottom surface of the annular shoulder contacting the anvil;

whereby the punch stretches the sidewall of the cup when it is forced downwardly into the cup by the forming arm and an annular ridge is formed when the punch contacts the anvil, the annular ridge serving as a fill mark to provide a user of the cup with a consistent measure of volume.

4. Apparatus for forming a fill line in a frusto-conical shaped paper cup having a rim that surrounds a top edge of a sidewall of the cup as claimed in claim 3, wherein the annular recess has a sidewall that is substantially vertical.

5. Apparatus for forming a fill line in a frusto-conical shaped paper cup having a rim that surrounds a top edge of a sidewall of the cup as claimed in claim 4, wherein the anvil is spaced about ⅜" below the groove for receiving and supporting the rim of the cup.

6. Apparatus for forming a fill line in a frusto-conical shaped paper cup having a rim that surrounds a top edge of a sidewall of the cup as claimed in claim 4, wherein the anvil is a flat surface that is substantially perpendicular to the sidewall of the annular recess.

* * * * *